United States Patent Office 2,998,528
Patented Aug. 29, 1961

2,998,528
IONIZATION CHAMBER
Stewart A. Fox, Lyons, Ill., assignor to Nuclear-Chicago Corporation, Cook County, Ill., a corporation of Delaware
Filed Apr. 9, 1959, Ser. No. 805,205
9 Claims. (Cl. 250—106)

This invention relates to an improvement in radioactivity detection and measurement devices, and particularly to an improved ionization chamber for measurement of low energy beta radiation.

The ionization chamber of the invention is suited for general utility measurement of the activity of solid and liquid samples, particularly for the measurement of carbon 14 and tritium activities, which consist of beta particles of relatively low energy. The chamber has provision for insertion of samples under measurement, both solid and liquid, directly into the chamber volume, and is so designed that it is readily employed with large-area and small-area samples.

A practical requirement for ionization chamber measurements of low-energy beta rays is the direct introduction of samples into the chamber. The design of a general utility chamber which may be used not only for solid samples, but also for the various types of liquid and solution samples which are commonly encountered, presents substantial problems, since the chamber construction requirements differ in important respects. In the case of samples in solution in a solvent such as water, a sealed construction may lead to vapor saturation in the chamber and thus produce spurious results, due to insulator leakage. The reaching of vapor saturation may be avoided by leaving the chamber open to the ambient atmosphere, with the size of the opening so provided being sufficient to assure adequate vapor diffusion.

This manner of dealing with the problem of vapor saturation is not, however, suitable for use where the activity is in the liquid itself, as in the case of tritiated water. In such cases the ionization-producing radiation emanates both from the liquid sample and from the vapor. If the chamber is left open for diffusion, the ionization current will vary with the rate of diffusion of the radioactive vapor to the exterior of the chamber. Accordingly, for such measurements it is desirable to seal the chamber and to fix the vapor pressure below saturation by such means as dilution of the aqueous sample with, for example, phosphoric acid.

It will thus be seen that a chamber which is to be suitable for low-energy activity measurement on a variety of types of samples must be readily convertible from a substantially sealed construction to a construction having a free diffusion path to the exterior. It is found, however, that the provision of simple direct apertures to the exterior in the unsealed condition can produce serious errors in highly sensitive measurements, due to the entry of ambient light and electrostatic fields. Thus, the vapor diffusion openings employed with volatile solvents are desirably tortuous in order to permit the desired diffusion without the entry of light or electrostatic fields into the chamber.

The ionization chamber of the invention, in addition to providing simple introduction and withdrawal of samples of all types into and from the chamber, provides in a simple and inexpensive manner for the conversion of the chamber in accordance with the requirements of the particular sample, or series of samples, under measurement.

For understanding of the construction by which the above advantages are achieved, reference is made to the embodiment of the invention illustrated in the annexed drawing, in which.

Figure 1:
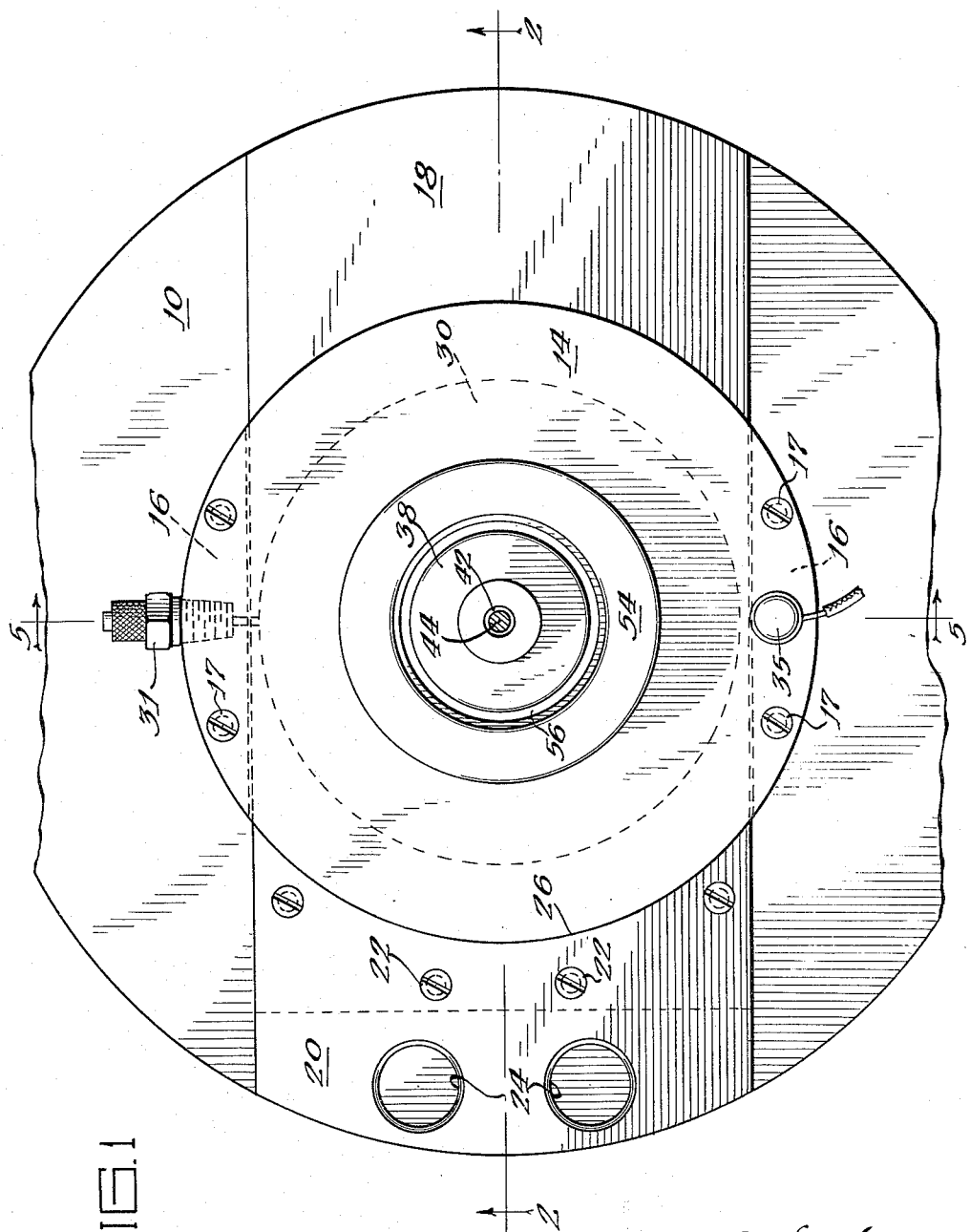
FIGURE 1 is a top plan view, partially in section, of an ionization chamber made in accordance with the invention.

The ionization chamber selected for illustration is mounted on a base plate 10 supported by feet 12. The interior cavity of the chamber is formed in a housing block 14 which is machined with support extensions or spacers 16 at the opposite sides thereof, the support extensions being secured by screws 17 to the base plate. A flat slide or tray 18 fits in sliding relation between the internally parallel spacer portions 16, being formed of a unitary rectangular flat plate, and a handle portion 20 is secured by screws 22 to the protruding end of the slide 18. The handle 20 has finger holes 24 for easy manipulation, and the inner edge 26 of the handle conforms to the shape of the housing block 14 to define the inner or inserted position of the slide.

The upper surface of the slide 18 has a circular sample-holding recess 28. The under surface of the region of the block 14 between the spacer portions 16 is machined to form a flat round cavity, to which is connected a gas inlet nipple 31. In the fully inserted position of the slide (illustrated in all figures of the drawing) the sample-holder recess 28 is concentric with the chamber recess 30, so that in essence the sample-holder portion of the slide itself constitutes an integral portion of the ionization chamber cavity, the diameter of the sample-holder portion of the slide being approximately equal to the diameter of the cavity recess in the housing block.

Vertical apertures 32 are circularly disposed in the top wall of the housing block 14, forming a symmetrically dispersed vent. The outer ends or mouths of these apertures terminate in an annular groove 34 in the upper surface of the housing. A binding post 35 serves as the ground or reference potential connection of the chamber.

The center of the uper wall of the housing has a threaded aperture receiving an electrode support bushing 36, having a knurled flange 38 which compresses an O-ring 40 against the top of the housing block. The bushing 36 has a central aperture 42 through which passes an electrode support rod 44 which terminates at its upper end in a guard ring and connector assembly 46 (not illustrated in detail). To the lower end of the support rod 44 is secured a collar 50 having radial electrode rods 52 serving as the collecting electrode of the chamber.

Resting in the groove 34 is a cap ring, generally designated 54, having a central (with regard to thickness) portion 56 of an inner diameter somewhat smaller than the inner diameter of the groove 34 but somewhat larger than the diameter of the flange 38. The ring has on one surface (the upper surface in FIGURES 1 through 5 and the lower surface in FIGURE 6) a rim extension 58 of radial thickness and depth corresponding to the radial thickness and depth of the groove 34. On the other surface (the lower surface in FIGURES 1 through 5 and the upper surface in FIGURE 6) there is a thin rim extension 60 corresponding in outer diameter to the outer diameter of the groove 34 but of such small radial thickness as to leave the apertures 32 open. The depth of the rim 60 is greater than the depth of the groove 34, so that when the rim 60 is seated in the groove (FIGURES 1 through 5), the portion 56 is substantially spaced not only from the apertures 32 but also from hte upper surface of the housing block 14, thus providing a tortuous gas or vapor diffusion passage through the apertures 32, thence through the space between the cap and the upper surface of the housing, and then out through the annular opening between the cap and the flange 38, the interior of the chamber being shielded from both outside light and electrostatic fields by this tortuous shaping of the vapor diffusion path illustrated by arrows in the drawing, the opaque conducting block and cap being interposed in all straight-line paths between the interior and exterior.

Figure 2:
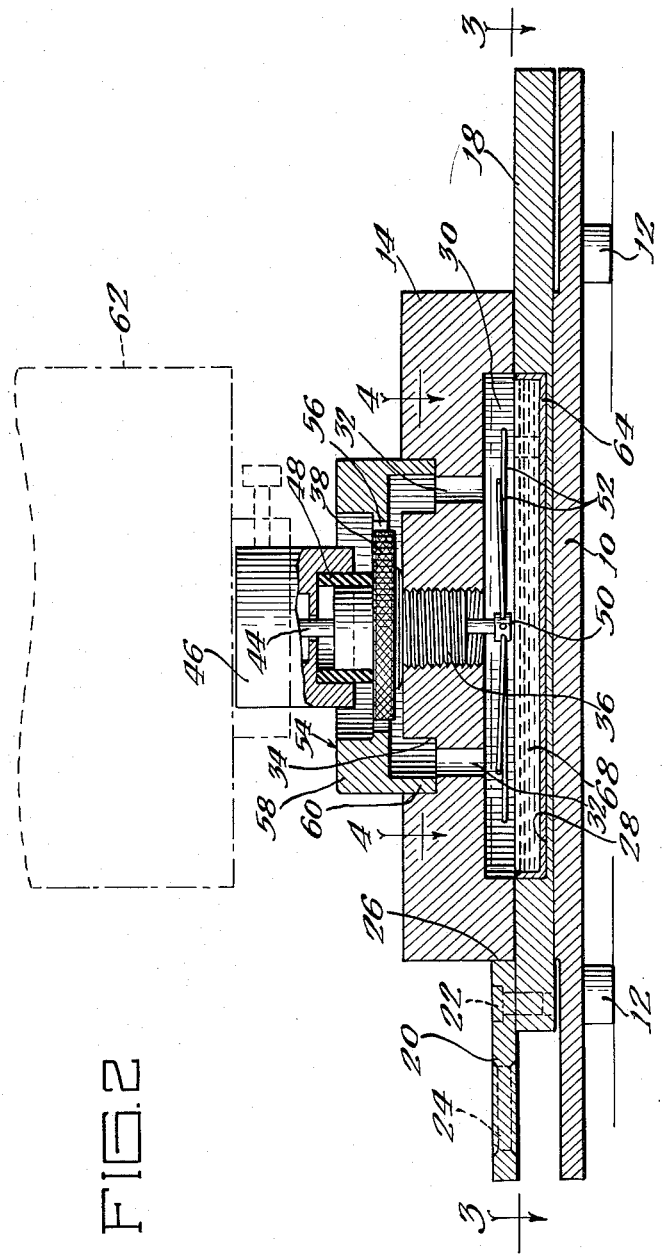
FIGURE 2 is a vertical sectional view taken along the line 2—2 of FIGURE 1 and showing in dotted form the manner of connection of a current or charge measuring apparatus to the ionization chamber.

As illustrated schematically in FIGURE 2, a suitable polarizing voltage source and current or charge measuring device 62, such as a dynamic condenser electrometer, may be secured in place on top of the guard ring and connector assembly 46 by provision of a suitable mating connector; alternatively, the chamber may be employed with a suitably terminated connecting cable, although the elimination of such cables is desirable for measurements requiring low leakage and capacity.

Figure 3:
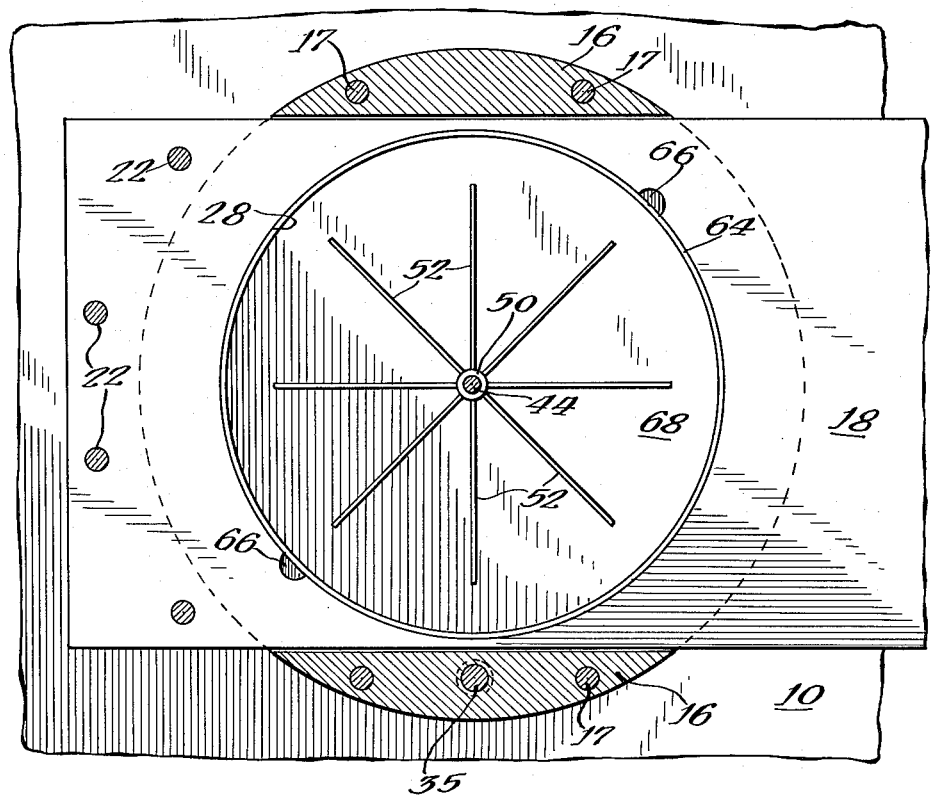
FIGURE 3 is a horizontal sectional view taken along the line 3—3 of FIGURE 2 in the direction indicated by arrows.
Figure 4:
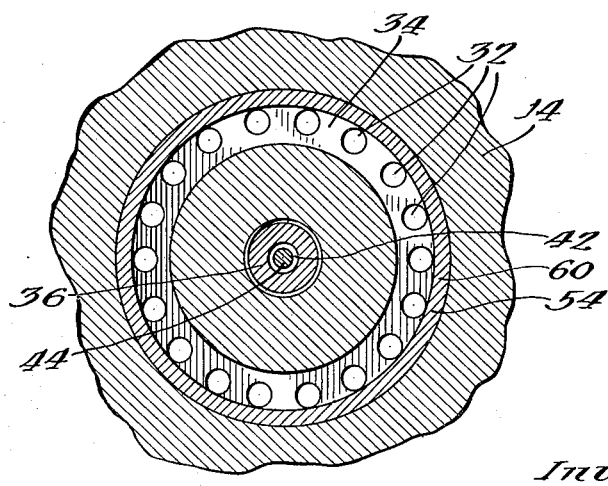
FIGURE 4 is a horizontal sectional view taken along the line 4—4 of FIGURE 2 in the direction indicated by arrows.
Figure 5:
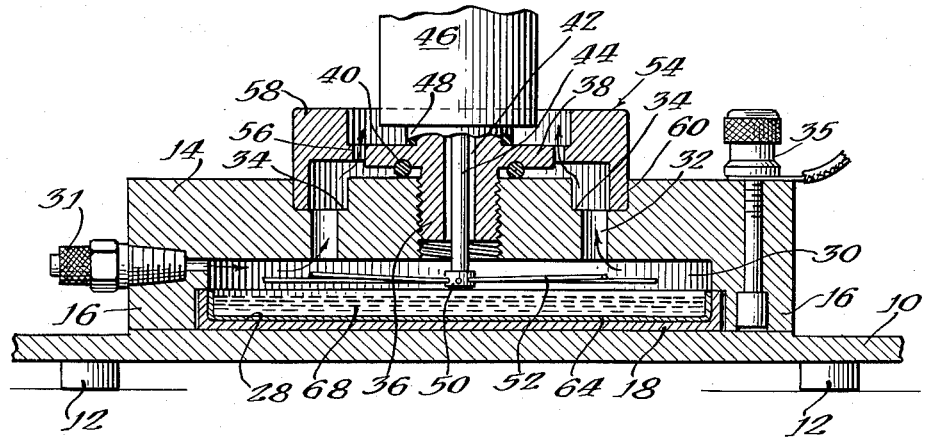
FIGURE 5 is a vertical sectional view taken along the line 5—5 of FIGURE 1 in the direction indicated by arrows.

It will be seen that the illustrated slide construction, wherein the lower portion of the chamber is essentially slotted at opposite sides, with the slide completing the cavity enclosure of the chamber, permits ready insertion of samples into the fairly well sealed (except for the gas vents) enclosure of the chamber. Withdrawal of the slide (motion to the left in FIGURES 1 and 2) permits ready change of samples. Liquid samples may be simply inserted in a pan 64 (FIGURES 2, 3, and 5). It will be understood by those skilled in the art that the depth of the liquid sample 68 illustrated in the drawing is substantially exaggerated for clarity of illustration, since in the actual practice of counting of samples of beta-emitting materials such as carbon 14, extremely thin liquid layers are normally employed. The area of the pan being substantially equal to the area of the chamber, the sensitivity advantage of large-area samples is readily obtained. Tool access notches 66 in the slide permit ready insertion and removal of such pans.

Figure 6:
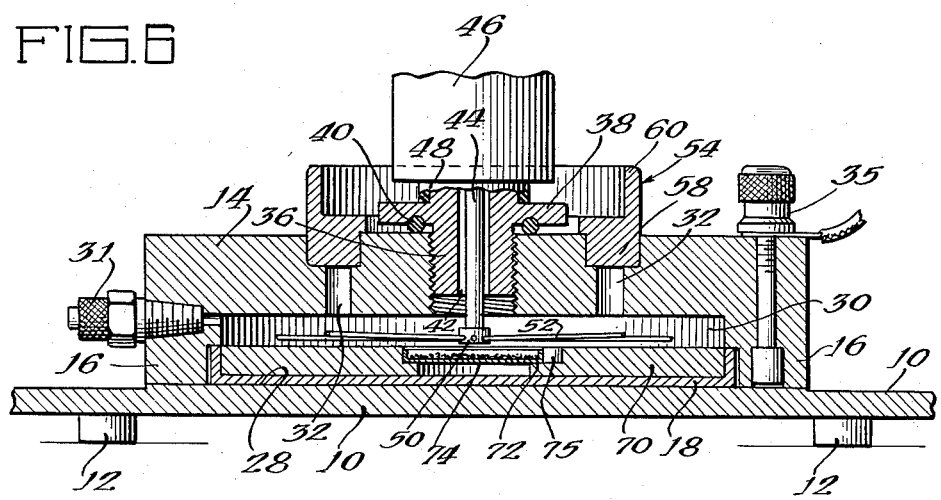
FIGURE 6 is a view corresponding to FIGURE 5, but illustrating certain of the parts in a different position employed for the counting of solid samples.

As shown in FIGURE 6, the device is also provided with an adaptor plate 70 for counting samples of smaller area, the outer dimension of the plate 70 snugly fitting the slide recess, and the adaptor having a central recess 72 receiving smaller sample pan or holder 74. The recess 72 has an access notch 75 for the same purpose as the notches 66 in the slide. In FIGURE 6, the small sample illustrated at 76 is shown as a powder or other solid, but it will be understood that the small sample employed with the adaptor plate may likewise be liquid, and the large-area sample may be solid.

Where solid samples are measured, the diffusion vent is not only not required, but is indeed undesirable for maximum sensitivity. The sensitivity is limited by fluctuations in background current and the latter cannot be held to the lowest possible values if atmospheric radon and similar activities are not excluded from the chcamber. In the position of the parts illustrated in FIGURE 6, designed for the counting of solid samples, the ring 54 is inverted with respect to its previous position. The rim extension 58 fills the groove 34 and seals the apertures 32. Under these conditions, the enclosure is fully shielded from both light and electrostatic fields, and also from ambient air activities. The chamber may be flushed by means of the gas inlet, either preliminary to each measurement, or during the measurement, using tank nitrogen or another desired gas, the small leakage existing providing a minimum requirement of gas if continued flushing is desired.

It will, of course, be understood from what has previously been stated that in the case of liquid samples in which the activity under measurement appears in the vapor, as well as the liquid, phase, the measurement is performed in the substantially sealed condition of FIGURE 6; in such cases, however, the volatility of the liquid must be kept sufficiently low to prevent condensation, as by dilution in a suitably selected additive. For such operation, gas flushing is undesirable, since the vapor contribution in the measurement is not easily held constant.

In accordance with the patent laws, one embodiment of the invention has herein been illustrated and described. However, it will be readily understood by those skilled in the art that the teachings of the invention are not limited to the particular embodiment shown. The basic teachings of the invention will readily be adapted to constructions far different in detail of operation and in appearance from the specific one illustrated. Many such variations will be immediately obvious, and others will become apparent upon study. Accordingly, the scope of the patent protection to be afforded the invention should not be determined from the particular embodiment illustrated, but from the appended claims.

What is claimed is:

1. An ionization chamber for radioactivity measurements comprising an enclosure forming a cavity having a collecting electrode therein, means for inserting radioactive samples into the cavity, and a vapor diffusion outlet from the cavity comprising a plurality of spaced apertures in the enclosure and a cap overlying the apertures and having a first position wherein the cap abuts against the apertures to seal them and a second position wherein the cap abuts against the region of the enclosure adjacent to the apertures, but the portion of the cap in alignment with the apertures is spaced therefrom to form a gas passage shielding the interior from exterior light and electrostatic fields.

2. An ionization chamber for radioactivity measurements comprising an enclosure forming a cavity having a collecting electrode therein, means for inserting radioactive samples into the cavity, a vapor diffusion outlet from the cavity comprising a plurality of apertures in the top of the enclosure, and a cap member on the top of the enclosure, said cap member having a first position of rest on the enclosure wherein the surface of the cap member seals the apertures and a second position of rest on the enclosure wherein the surface of the cap member is spaced from the apertures but in alignment therewith to permit the flow of gas without the entry of light and electrostatic fields.

3. An ionization chamber for radioactivity measurements comprising a cavity having a collecting electrode insulatedly supported therein and an slide member forming the bottom of the cavity and having a recess in the upper surface thereof, whereby samples may be inserted into and removed from the ionization chamber by means of the slide member, a gas inlet to the cavity, a vapor diffusion outlet from the cavity comprising apertures distributed about the top of the cavity, and means for selectively opening and closing the vapor outlet for use of the chamber with a variety of types of samples.

4. An ionization chamber as set forth in claim 3 having an adaptor member fitting the recess and having a smaller recess in the central portion of the upper surface thereof, whereby the slide may be used with sample pans of various sizes.

5. A radioactivity detection and measurement device comprising an enclosure having a plurality of electrodes adapted for sealed or open operation characterized by a vapor diffusion outlet comprising an annular ring of apertures and a cap having one annular surface of a shape forming a flush cover for the apertures and an opposite surface of a shape to seat against the apertured portion of the enclosure only out of register with the apertures.

6. The device of claim 5 wherein the enclosure has an annular groove in the outer surface thereof, the apertures terminating in the groove, and the cap comprises an annular ring having on one side an annular lip of substantially the width of the groove and on the other side an annular lip of lesser thickness than the groove, whereby the apertures are sealed when one lip is seated in the groove and open when the other lip is seated in the groove.

7. An ionization chamber for radioactivity measurements comprising an enclosure forming a disk-shaped horizontal cavity having a circularly symmetrical collecting electrode insulatedly supported in the central portion thereof, an electrical connector for the collecting electrode on the top central portion of the enclosure, circularly disposed apertures in the enclosure surrounding the connector to form an annular vent, and an annular cap ring overlying the apertures, the cap ring having one annular surface registering with the vent, and an opposite annular surface out of register with the vent, whereby the cavity may be selectively vented or sealed by reversal of the cap ring.

8. An ionization chamber for radioactivity measurements comprising a conducting enclosure forming a cavity, the walls of the enclosure having oppositely disposed horizontal slots at the base of the cavity, a collecting electrode insulatedly mounted in the enclosure, a slide member of cross-sectional shape fitting the slots, the slide member having a sample-bearing recess in the top surface thereof, a gas inlet to the cavity, a plurality of apertures in the top of the enclosure, and a cap member on the top of the enclosure having a first position of rest wherein the surface of the cap member seals the apertures and a second position of rest wherein the surface of the cap member is spaced from the apertures to open the apertures while shielding the interior from light and electrostatic fields.

9. An ionization chamber for radioactivity measurements comprising a disk-shaped horizontal cavity having a circularly symmetrical collecting electrode insulatedly supported therein, and an annular vapor diffusion vent in the top of the cavity around the axis thereof, at least one opaque conducting member being interposed in every straight-line path between the interior and exterior of the chamber.

References Cited in the file of this patent

UNITED STATES PATENTS

| | | |
|---|---|---|
| 2,490,298 | Ghiorso et al. | Dec. 6, 1949 |
| 2,622,208 | Bernstein | Dec. 16, 1952 |
| 2,826,076 | Boratz et al. | Mar. 11, 1958 |
| 2,843,753 | Meeder | July 15, 1958 |